W. A. SIMONDS.
Apparatus for Carbureting Air.

No. 49,448.  
Patented Aug. 15, 1865.

WITNESSES  
Edw. F. Brown  
R. Morrow

INVENTOR  
Warren A. Simonds

UNITED STATES PATENT OFFICE.

WARREN A. SIMONDS, OF BOSTON, MASSACHUSETTS.

IMPROVED APPARATUS FOR CARBURETING AIR.

Specification forming part of Letters Patent No. 49,448, dated August 15, 1865.

*To all whom it may concern:*

Be it known that I, WARREN A. SIMONDS, of Boston, county of Suffolk, and State of Massachusetts, have invented certain new and useful Improvements in Carbureting Apparatus for Carbonizing Air for Illuminating Purposes; and I do hereby declare the following to be a full, clear, and exact description of the same, reference being had to the accompanying drawings, making part of this specification, in which—

Figure 1:
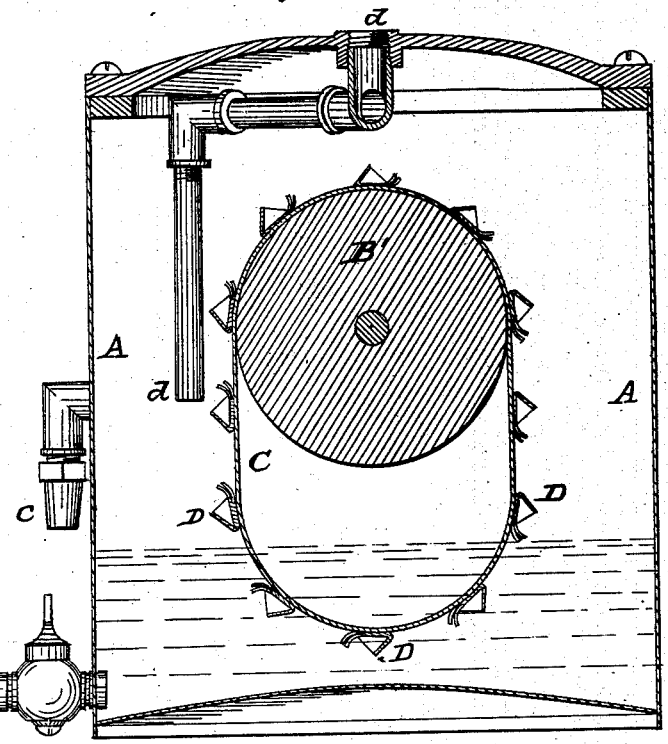
Figure 2:
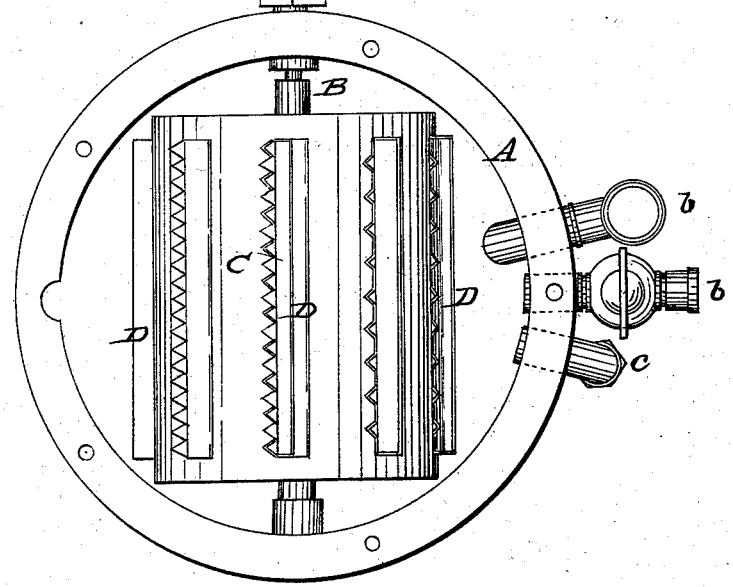

Figure 1 is a vertical section, and Fig. 2 a horizontal section, of a carbureting apparatus containing my improvements.

Like letters refer to the same parts in both figures.

The nature of my invention consists in a novel construction and arrangement of parts for agitating the volatile oil or liquid for the purpose of mixing it with atmospheric air for illuminating purposes, as hereinafter described.

In the drawings, A represents a reservoir, which in this instance consists of a large vertical cylinder tightly closed at top and bottom. This reservoir may be of any desired form or size, and is designed to contain the volatile liquid to be mixed with the air. The drawings represent this liquid as occupying about one-fourth to one-third the capacity of the reservoir. Near the upper part of this reservoir is placed a shaft, B, provided with a drum, B', which extends across the reservoir, and which may be made barrel shaped, having its largest diameter in the center of its length. Over this drum is suspended the endless belt C, which may be made of leather, cords, chains, or other suitable material, and which is provided with the buckets D, which extend across the belt, as shown by the drawings. The belt, resting on and supported by the drum, is made to drop some distance below the drum in passing under the same, thereby giving it an oblong shape, as represented in Fig. 1, so that while the drum is raised considerably above the volatile liquid in the reservoir, the lower portion of the belt will be submerged in said liquid for about one-fourth to one-third (more or less) of its length.

The buckets are made of V or other suitable form, in cross-section, and the side thereof attached to the belt is furnished with a scalloped edge, for the purpose of discharging its contents in the form of a spray, and thereby causing it more readily to impregnate with its contents the atmospheric air contained in the upper portion of the reservoir.

The drum is made to rotate by means of power, as weights, springs, &c., applied in any of the usual and well-known ways to its shaft, which is shown as extending through the cylinder or reservoir, and which in this instance is shown as having a pulley, $a$, applied to its outer end.

The necessary supplies of the volatile liquid and of atmospheric air are obtained through pipes attached, as shown at $b$ $c$, and the air, as fast as properly carbonized and prepared for illuminating purposes, is permitted to pass off through the pipe $d$, (shown in this instance arranged in the top of the reservoir,) the air and liquid being forced into the reservoir in any usual or known manner.

It will be perceived that motion being communicated to shaft B and drum B', a rotary motion is imparted to the oblong endless belt by reason of its friction on the drum, thereby causing the buckets to dip into and carry up the volatile fluid and discharge the same in form of spray, as above explained.

The position of the inlet and outlet openings and the form and dimensions of the reservoir may be varied to suit the conditions of its use without departure from my invention.

What I claim, and desire to secure by Letters Patent, is—

1. A wide endless belt with buckets across its surface, arranged so as to revolve in a vaporizing-chamber and to operate as and for the purpose herein set forth.

2. Operating an oblong and endless belt, with buckets and troughs attached, independently and loosely over a pulley the diameter of which is largest in the center of its length, and which is made fast to a shaft, said shaft being operated with gears and weights below.

3. Adjusting a long, oblong, and endless belt made from leather, metal, or other material, with buckets and troughs attached, so that the lower part (or about one-fourth to one-third of its length) shall be submerged in volatile liquids, such as hydrocarbon, as herein shown.

4. A reservoir of any desired shape or position, whether perpendicular or horizontal, with a shaft and pulley upon the inside above the center and near the top of said reservoir, and with a long endless belt with buckets or troughs, more or less in number, attached and operated as before described.

WARREN A. SIMONDS.

Witnesses:
EDM. F. BROWN,
R. MORROW.